US007627666B1

(12) United States Patent
DeGiulio et al.

(10) Patent No.: US 7,627,666 B1
(45) Date of Patent: Dec. 1, 2009

(54) TRACKING SYSTEM INCORPORATING BUSINESS INTELLIGENCE

(75) Inventors: Vincent E. DeGiulio, Chicago, IL (US); Michael E. Boushka, Stanley, KS (US); Nikkole K. Karl, Auburn, WA (US); Edy S. Cosillo, Wheaton, IL (US); Christopher A. Bayham, Chicago, IL (US); Christopher F. Alladin, Lindenhurst, IL (US); Bardia Matinpour, Atlanta, GA (US); Jeffrey S. Bushey, Dublin, OH (US); Jay J. Hennings, Kansas City, MO (US)

(73) Assignee: Accenture Global Services GmbH, Schaffhausen (CH)

( * ) Notice: Subject to any disclaimer, the term of this patent is extended or adjusted under 35 U.S.C. 154(b) by 882 days.

(21) Appl. No.: 10/056,887

(22) Filed: Jan. 25, 2002

(51) Int. Cl.
G06F 15/173 (2006.01)

(52) U.S. Cl. .................. 709/224; 709/223; 709/225; 709/229; 705/28; 705/29

(58) Field of Classification Search .............. 709/223, 709/224, 225, 229; 705/28, 29
See application file for complete search history.

(56) References Cited

U.S. PATENT DOCUMENTS

| | | | |
|---|---|---|---|
| 5,621,892 A * | 4/1997 | Cook | 709/224 |
| 6,049,828 A * | 4/2000 | Dev et al. | 709/224 |
| 6,148,291 A * | 11/2000 | Radican | 705/28 |
| 6,216,130 B1 | 4/2001 | Hougaard et al. | |
| 6,219,653 B1 | 4/2001 | O'Neill et al. | |
| 6,236,996 B1 | 5/2001 | Bapat et al. | |
| 6,266,432 B1 | 7/2001 | Wiens | |
| 6,295,449 B1 * | 9/2001 | Westerlage et al. | 455/422.1 |
| 6,509,830 B1 * | 1/2003 | Elliott | 340/286.02 |
| 6,674,368 B2 | 1/2004 | Hawkins et al. | |
| 6,700,493 B1 | 3/2004 | Robinson | |
| 2002/0091501 A1 * | 7/2002 | Durbin et al. | 702/188 |

(Continued)

FOREIGN PATENT DOCUMENTS

WO 96906 A 12/2001

OTHER PUBLICATIONS

European International Search Report for International Application No. PCT/US03/02242 dated Jul. 9, 2004.

(Continued)

Primary Examiner—Ario Etienne
Assistant Examiner—Barbara N Burgess
(74) Attorney, Agent, or Firm—Vedder Price PC

(57) ABSTRACT

A tracking manager, in communication with a status tracking structure and one or more client, provides event information regarding a plurality of objects, received from the status tracking structure, and alert information to the clients. Immediate rules and periodic rules are assessed in light of event information, which rules are stored in a rule storage component such that any of the rules may be modified independently of a rule execution component within the tracking manager. When the conditions defining any of the business rules are met, alert events are generated, stored and provided to the clients. Additionally, a map control operating in the clients allows selected portions of the event information to be provided to the clients. A data structure corresponding to a map schema is provided such that specialized map images may be readily provided and associated with each other.

22 Claims, 10 Drawing Sheets

U.S. PATENT DOCUMENTS

2003/0069648 A1*    4/2003    Douglas et al. .............. 700/2

OTHER PUBLICATIONS

Turner, Thomas E.; Real Time Locating Systems; WhereNet Marketing and Business Development; Nov. 1999; pp. 3-7 with front and back cover.

Wherenet Corp.; WhereNet products and services information; 2000.

Savi Technology; Smartchain Solutions products pages; www.savi.com/solutions; printed from website Jun. 22, 2001; 18 pages.

Hoffman, Kurt C.; Real-Time Location Systems Take Asset Tracking to New Level; Global Logistics & Supply Chain Strategies; from www.supplychainbrain.com; Oct., 2001.

Hoffman, K.C., "Real-time Location Systems Take Asset Tracking to a New Level", www.suplychainbrain.com, Oct., 2001 XP002259982.

Patent Abstracts of Japan, vol. 1999, No. 12, Oct. 29, 1999, & JP 11 203349 A.,(Fujitsu Ltd.), Jul. 30, 1999.

Anonymous: "ArcView Business Analyst (An ESRI White Paper, Mar. 2001)" 'Online! Mar. 2001, xp002368055, URL: http://www.esri.com/library/whitepapers/pdfs/avbadata.pdf.

Brody, R: "GIS Applications in Competitive Intelligence", Proceedings of the National Online Meeting, May 18, 1999, p. 41-46, XP008032590.

Mohraz, K.Ed, Kl-Joune Li, et al, Association for Computing Machinery: "Geographical Analysis in SAP Business Information Warehouse" ACM-GIS 2000. Proceedings of the 8th ACM Symposium on Advances in GEographic Information Systems, Washington DC Nov. 10-11, 2000, ACM International Symposium on Advances in Geographic Information Systems, New York, NY: ACM,US vol. Conf. 8, Nov. 10, 2000, pp. 191-193.

Communication and Supplementary Search Report issued by the European Patent Office for Application 03705903.7-2221 on Mar. 3, 2006.

"Axcess Inc. Introduces Enhanced Wireless Monitoring Capabilities; ActiveTag Technology Provides Real-Time, Automated Status Information", Business Editors & High-Tech Writers, Business Wire, New York, Aug. 30, 2001.

* cited by examiner

Generic Delivery Co. | About | Help | User Admin | Equipment Admin | Log Out |
| Main | Search | Alerts | Reports |

Facility | Priorities
Chicago ▶ | All ▶

Get New Alerts

Message:
This tractor has not received maintenance and exceeded 25,000 mile maintenance cycle

| Find | Alert ID ▲▽ | Description ▽ | Priority ▽ | Equip ID ▽ | Location ▽ | Date-Time ▽ | Send Message To Location | Send E-Mail | Recheck In 5 Min | Take No Action |
|---|---|---|---|---|---|---|---|---|---|---|
| 🔍 | 6347 | More than 20 empty trailers | Med | | | 2001-06-26 15:45:33 | Message | E-Mail | Recheck | No Action |
| 🔍 | 6349 | Empty trailer leaving facility | Hi | 169 | Guard Shack | 2001-06-26 15:46:22 | Message | E-Mail | Recheck | No Action |
| 🔍 | 6350 | Trailer needs maintenance | Hi | 61 | Guard Shack | 2001-06-26 15:48:09 | Message | E-Mail | Recheck | No Action |
| 🔍 | 6353 | Dispatch has not occurred | Lo | 95 | Outbound | 2001-06-26 15:51:16 | Message | E-Mail | Recheck | No Action |
| 🔍 | 6354 | Dock door empty for 30 minutes | Med | | | 2001-06-26 15:51:56 | Message | E-Mail | Recheck | No Action |
| 🔍 | 6372 | Incorrect dock setup | Med | 177 | Outbound | 2001-06-26 15:54:06 | Message | E-Mail | Recheck | No Action |
| 🔍 | 6373 | Multiple trailers open | Hi | 152 | Linehaul | 2001-06-26 15:55:09 | Message | E-Mail | Recheck | No Action |
| 🔍 | 6376 | Two partial | Med | | | 2001-06-26 | Message | E-Mail | Recheck | No Action |

FIG. 9

TRACKING SYSTEM INCORPORATING BUSINESS INTELLIGENCE

FIELD OF THE INVENTION

This invention relates generally to asset tracking systems and, more particularly, to such tracking systems that incorporate business intelligence.

BACKGROUND OF THE INVENTION

In industry nowadays, success or failure depends in part upon knowing up to date status of various company assets. For example, in the freight delivery business up to date knowledge of the location and, in some instances, the environment of various assets is critical to efficient and reliable operations. Failure to maintain up to date status information can result in temporarily lost assets, sub-optimal use of the assets, and in the case of freight delivery, missed or late deliveries.

Recently, technologies have been developed that greatly assist in tracking locations of assets. For example, global positioning systems (GPS) use wireless signals transmitted by earth-orbit satellites to calculate the position of a receiving device. Although relatively expensive, GPS receivers are capable of providing relatively accurate location information for virtually any point in the world.

More recently, radio frequency identification (RFID) systems have been developed in which "tags" wirelessly communicate with readers. Generally speaking, tags may be either passive or active. Passive tags absorb signals transmitted by the readers and retransmit their own signals, which signals include information identifying a particular tag. While passive tags do not require a local power source, their resulting transmit range is relatively short, typically on the order of a few centimeters, up to 1-2 meters. In contrast, active tags include a local energy source such that their transmit range is extended, typically on the order of several meters. Regardless of the types of tags used, knowledge of the fixed location of the reader devices enables system users to likewise ascertain the location of assets that have tags attached thereto. Currently, RFID systems are typically used in parcel tracking and sorting, container tracking, luggage tracking, retail tracking, warehouse tracking and inventory operations.

While GPS and RFID technologies greatly assist in the task of asset tracking, they do not by themselves provide a total solution to the problem of asset tracking. That is, these technologies, by themselves, do not present the location data in a particularly useful way, nor do they automatically evaluate such data in accordance with industry-specific rules or procedures. To this end, various companies have begun providing solutions which address the larger business issues associated with asset tracking. For example, WhereNet Corp. and Savi Technologies provide so-called yard management systems or solutions. While the systems provided by these companies are believed to provide an interface for observing location information, a need still exists for a status tracking system that not only provides an interface for monitoring real-time status information, but that also integrates with business legacy systems and, perhaps more significantly, integrates business intelligence so as to obtain the maximum value from the status data being obtained.

SUMMARY OF THE INVENTION

The present invention provides a status tracking system in which status information regarding a plurality of objects or assets is provided via an intuitive interface, and that incorporates business intelligence. In particular, the present invention provides a status tracking structure in communication with a tracking manager. The tracking manager, in turn, communicates with one or more clients and provides event information and alert information regarding the plurality of objects. For example, the objects may include virtually any type of container, pallet, truck, trailer or any other asset that an organization may wish to track. In one embodiment of the present invention, immediate rules and periodic rules are assessed in light of event information received from the status tracking structure. Event information comprises any type of information that may be monitored by the status tracking structure. For example, the event information may comprise location information or environmental information regarding a given tag, and hence, the object to which the tag is associated. In another embodiment of the present invention, the rules are stored in a rule storage component such that any of the rules may be modified independently of a rule execution component within the tracking manager. When the conditions defining any of the business rules are met, alert events are generated and stored. Operating in conjunction with control functions in the clients, an event dispatcher within the tracking manager provides information regarding the alert events to the clients. Additionally, a map control operating in the clients allows selected portions of the event information to be provided to the clients. In yet another aspect of the present invention, a data structure corresponding to a map schema is provided such that specialized map images may be readily provided and associated with each other. These and other aspects of the present invention will be more readily apparent with reference to the figures and description below.

BRIEF DESCRIPTION OF THE DRAWINGS

FIGS. 5-10 are exemplary screen shots where the present invention is applied to a trucking application.

DETAILED DESCRIPTION OF A PREFERRED EMBODIMENT OF THE INVENTION

Figure 1:
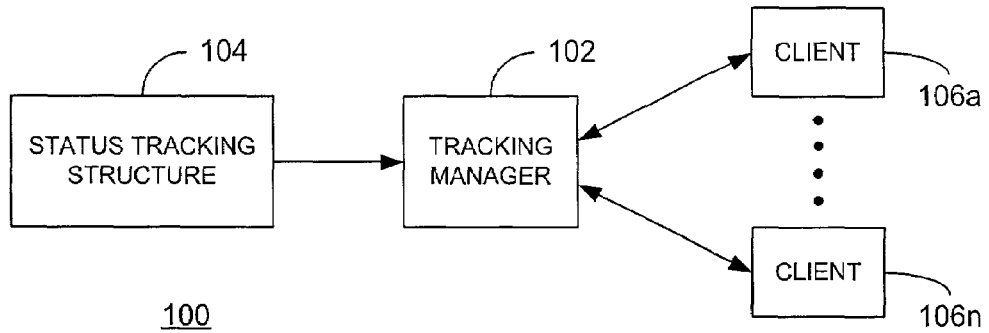
FIG. 1 illustrates a block diagram of a status tracking system in accordance with the present invention.

The present invention may be more readily described with reference to FIGS. 1-11 below. Referring now to FIG. 1, a status tracking system 100 is illustrated. The system 100 comprises a tracking manager 102 coupled to a status tracking structure 104. Additionally, the tracking manager 102 communicates with a plurality of clients 106*a*-*n*. The status tracking structure 104 preferably provides event information to the tracking manager 102. In the context of the present invention, event information preferably comprises any type of information that can be monitored including, but not limited to, location information regarding a plurality of objects. Such location information may be provided, as presently preferred, through the use of RFID tags and their associated readers, or through the use of GPS receivers. Additionally, the event information may comprise environmental information corresponding to the plurality of objects being tracked. Such environmental information may include, but is not limited to, information regarding temperature, humidity, pressure and vibration or any other environmental variable that may be measured via sensors. Regardless, the event information is provided to the tracking manager 102 which, in turn, assesses at least one business rule in light of the event information. When conditions defining one of the rules are met (i.e., when the rule is violated where rules are defined in a negative sense such as conditions to be avoided), alerts may be generated and stored for subsequent provision to clients of the system. The clients 106 may periodically poll the tracking manager 102 to obtain both the event information and any alert information generated in this manner. The event information and/or alert information may be subsequently displayed by the individual clients 106.

Figure 2:
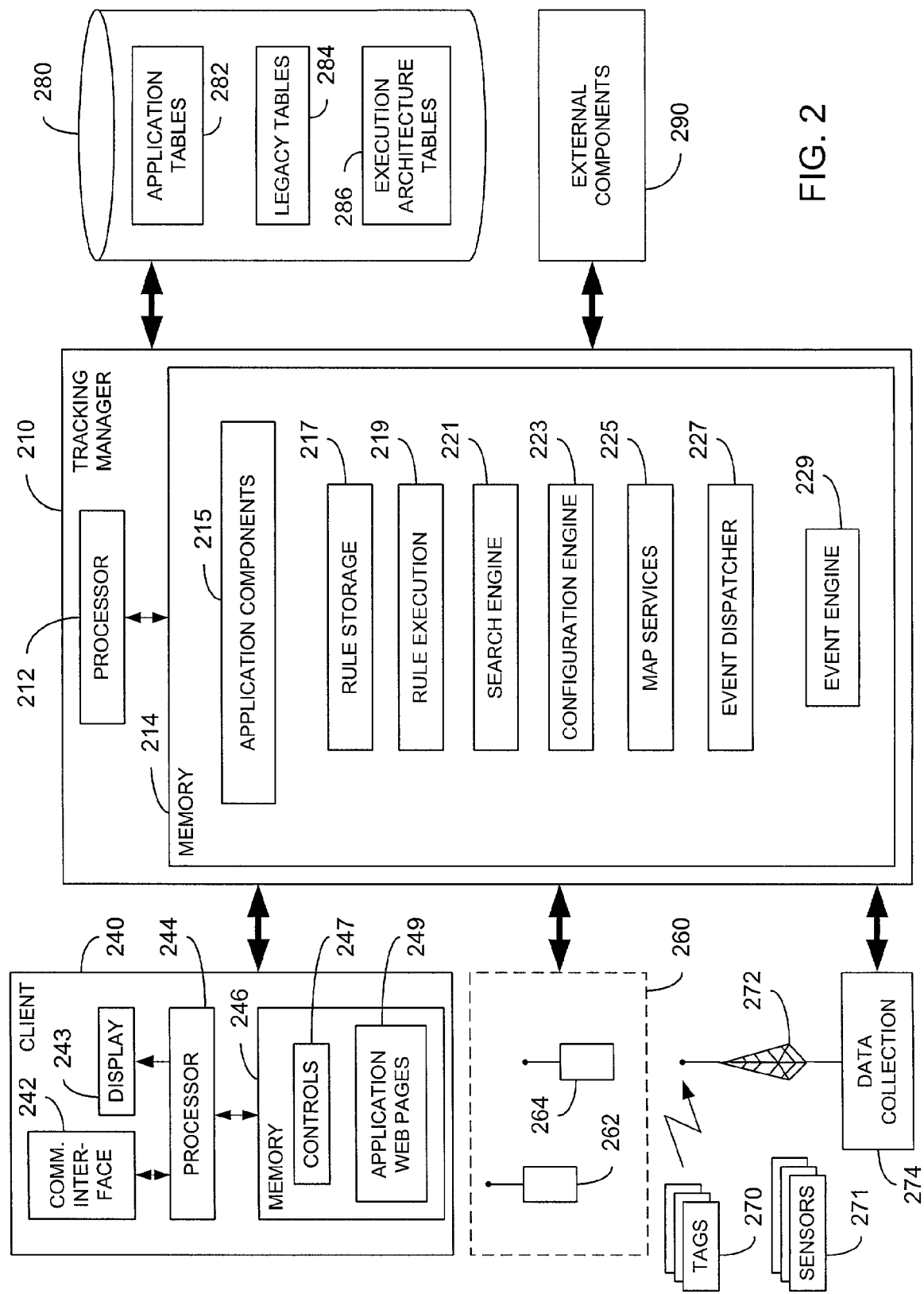
FIG. 2 illustrates a more detailed block diagram of a status tracking system in accordance with the present invention.

Referring now to FIG. 2, a more detailed illustration of the system 100 is provided. As shown in FIG. 2, the tracking manager 210 comprises a processor 212 (such as a microprocessor, microcontroller, digital signal processor or the like or combinations thereof) in communication with memory 214 (e.g., random-access memory, read-only memory, etc.). In a preferred embodiment, the memory 214 comprises stored software routines and data used to implement the variety of components illustrated in FIG. 2. Note that although the tracking manager 210 is illustrated as comprising a single processor 212 and memory 214, in practice, the tracking manager 210 may be implemented as a combination of processors and associated memories. For example, one or more server computers in communication with each other may be used to implement the tracking manager 210.

The stored software in the tracking manager 210, when executed by the processor 212, may cause the processor 212 to comprise the components, as shown. The application components 215 comprise those components necessary to implement a Web-based user interface to be presented on client devices. In a preferred embodiment, the application components 215 comprise page controllers (as known in the art) corresponding to a variety of web pages. As described in greater detail below, such pages may be used to present event information and alert information as well as provide search functionality and administrative tasks.

A rule storage component 217 is also provided. The rule storage component 217 may be implemented as memory devices (e.g., random-access memory, programmable read-only memory, etc.). As described in greater detail below, the rule storage component 217 provides storage for one or more rules embodying business logic appropriate to the particular application. For example, in the context of a trucking company, such rules may be defined so as to detect situations in which empty trailers are allowed to sit too long, or where multiple, partially-full trailers are dispatched to the same destination within a relatively short period of time. Regardless, in a preferred embodiment, the application components 215 and rule storage component 217 are implemented separate and apart from the other components 219-229 illustrated in FIG. 2. In this manner, the rules stored in the rule storage component 217 may be modified independently of the structure used to execute and assess the individual rules. This provides the advantage of being able to add, remove or modify existing rules without bringing the entire system offline, and thereby incurring added operational expenses.

The rule execution component 219 causes selected ones of the rules stored in the rule storage component 217 to be assessed in response to various stimuli. In particular, the present invention incorporates at least two different types of rules: immediate rules and periodic rules. Immediate rules comprise those rules that should be executed upon each receipt of event information from the status tracking structure. Generally, immediate rules are highly dependent on location or environmental events and are most significant when assessed in view of changes to such location or environmental information. Periodic rules, in contrast, are generally more dependent on events accumulating over a period of time. More particularly, periodic rules are evaluated on a periodic basis regardless of the number of intervening events that may have occurred. Furthermore, different classes of periodic rules may be assessed according to different frequencies. In a preferred embodiment, the rule execution component is implemented as a COM+ (component object model) component consisting of several classes. One class is provided for accessing immediate rules when called by an event engine component 229. Another class is provided consisting of one or more sub-routines used to evaluate the one or more categories of periodic rules when called by a configuration engine component 223.

The search engine component 221 accepts search parameters from clients and performs database queries based on the search parameters. In a preferred embodiment, the search engine component 221 implements a number of preset search queries defined in accordance with the particular application. For example, in a trucking application, searches for particular trailers, tractors, or other equipment particular to the trucking industry may be defined as the preset queries. In any event, the search engine component 221 provides the results of searches to the clients for presentation of the results. The search engine component 221 may be implemented as a COM+ component having a single class comprising a search function. In a presently preferred embodiment, input parameters to the search function are provided as an XML (Extensible Markup Language) string in which the particular search terms are delineated by appropriately descriptive XML tags. Likewise, the search results are provided by the search function as an XML string.

A configuration engine component 223 is provided to accept initialization values for customizable parameters. Further discussion of the configuration engine component 223 is provided with reference to FIG. 4 below. One particular aspect of the configuration engine component 223 is that it periodically calls upon the rule execution component 219 (in accordance with one or more of the configurable parameters) to execute one or more periodic rules, as described above. Additionally, the configuration engine component 223 operates to accept polling interval parameters from an administrator of the tracking manager 210. In part, these polling intervals are subsequently provided to clients that, in turn, use the polling intervals to determine how often to poll the tracking manager (via an event dispatcher component 227) to obtain event and alert information. In this manner, the polling intervals used by the clients are fully configurable by the tracking manager, as opposed to the clients themselves. Regardless, the configuration engine component 223 is preferably implemented as a continuously-running executable file.

The map services component 225 is provided to initialize clients with the appropriate map data when any client first accesses the tracking application. This is necessary because clients may be embodied in a number of different forms; for example, laptop computers, desktop computers, or even wireless hand-held devices. As known in the art, each of these devices has significantly different display mechanisms and therefore require appropriately formatted data in order to be properly displayed. The map services component 225 also provides updates as various views are traversed by a user. For example, if a given user is currently at a regional level view and thereafter selects a particular facility to view, the map services component is used to update the view of the selected facility. The map services component 225 may be implemented as a COM+component. In a preferred embodiment, several methods are provided by the map services component 225. A first method, when called, provides an XML string comprising various configuration values (discussed below) such as polling intervals and addresses for various directories of map images. Additionally, a method is provided that, when called, returns as XML string comprising information regarding all assets (e.g., asset identification, type, status, etc.) at a selected location. Further still, another method is provided that, when called, provides an XML string comprising information regarding the location for a selected asset. Those having ordinary skill in the art will recognize that such methods may be readily implemented using common programming techniques.

An event dispatcher component 227 operates in conjunction with clients to continuously provide updated information regarding events and alerts. In particular, the event dispatcher component 227 responds to requests from clients and provides updated event information or alert information depending on the particular view being displayed by the client. For example, if a client is currently displaying a view of a selected portion of a facility, only event or alert information regarding the selected portion of the facility will be provided. The client, in turn, sends event information and alert information requests to the event dispatcher component 227 in accordance with polling intervals established by the configuration engine component 223. In a presently preferred embodiment, the event dispatcher component communicates with clients via the so-called simple object access protocol (SOAP) as used to implement the Web Services communications suite. As known in the art, Web Services comprises a suite of protocols based on Hypertext Transfer Protocol (HTTP) and Extensible Markup Language (XML) that enable applications, in the most general sense, to communicate with each other without user intervention. It should be noted that the present invention is not limited by the protocols used for communication between various elements. For example, as those having ordinary skill in the art will recognize, protocols other than SOAP may be equally used to implement the present invention.

The event dispatcher component 227 is preferably implemented as a COM+ component. One function included in the component, when called, returns initialization information, such as an alerter poll interval. Another function, when called, returns information regarding the current highest level alert corresponding to a given location. Such information may be used to update an alert graphic or icon as described herein (see FIG. 5 and corresponding description). Finally, another function included in the event dispatcher component 227 returns an event type, time of event, asset identification, alert identification and location identification for all assets for a given location.

An event engine component 229 is provided and acts as an interface between the status tracking structure and the tracking manager. In particular, the event engine component receives event information from the status tracking structure comprising, in this case, a plurality of tags 270 and (optionally) a plurality of sensors 271 in communication with a variety of readers 272 and a data collection system 274. Note that the sensors 271, if provided, may communicate directly with the readers 272 or via the tags 270. As described in greater detail below, the event engine component accepts the event information from the status tracking structure and updates an event table and an asset table stored in a database 280. In a preferred embodiment, a polling interval is provided to the event engine component by the configuration engine component 223 which instructs the event engine 229 how frequently it is to poll the status tracking structure to obtain the event information. In a preferred embodiment, the event engine component is implemented as a Web Service, as known in the art, operating on a server. Additionally, the event engine component preferably communicates with the status tracking structure via SOAP, but may operate in accordance with any standardized communication protocol.

A single client 240 is illustrated in FIG. 2 and comprises a communication interface 242, a display 243, a processor 244 and a memory 246. In practice, a plurality of clients may be provided. As previously discussed, the client 240 may comprise any of a number of computing platforms suitable for communication with the tracking manager 210. In particular, client 240 is capable of displaying web pages, via the display 243, and may comprise a desktop computer, a laptop computer or any hand held device capable of displaying HTML-based (Hypertext Markup Language) and active server pages. The communication interface 242 is dependent upon the particular type of device embodying the client 240, but in a preferred embodiment, supports communications between the client 240 and the tracking manager 210 using SOAP-based Web Services. For example, where the client 240 is implemented as a desktop or laptop computer, the communication interface 242 may comprise a network interface card or modem. Alternatively, where the client 240 comprises a wireless hand held device, the communication interface 242 may comprise a wireless transceiver implementing a wireless modem or other communication protocol. Those having ordinary skill in the art will recognize that the communication interface 242 may be implemented in a variety of manners and the present invention is not necessarily limited in this regard. Likewise, the display 243 may comprise any of a number of well-known display devices, such as a liquid crystal display screen, and is typically dependent upon the particular type of device embodying the client 240. The processor 244 may comprise a microprocessor, microcontroller, digital signal processor or any other type of processing device or combination of such devices. The memory 246 may comprise any combination of volatile memory such as random access memory (RAM) or non-volatile memory such as read only memory (ROM) as known in the art. In addition to the system software programs typically used to control the client device 240, the memory 246 preferably comprises executable instructions embodying controls 247 and application web pages 249.

When executed by the processor 244, the instructions comprising the controls 247 cause the client to communicate with the tracking manager 210. In a preferred embodiment, the controls 247 comprise an alert control and a map control. The alert control periodically polls the event dispatcher component 227 to determine the highest level alert currently available regarding a current view being presented by the client 240. The alert control supplies the alert information it receives to software that provides a graphic representative of the alert information. Preferably, the alert control is implemented as an ActiveX control, as known in the art.

In a similar manner, the map control initially communicates with the map services component 225 to obtain map data regarding an initial view. When a client first establishes communications with the tracking manager (through the transmission, for example, of an initialization request), the map services component 225 provides the client with information instructing the client to access initialization information from a certain location. Preferably, the information instructing the client to access the location comprises a Uniform Resource Locator (URL) designating a predetermined server comprising the initialization information. As described below with reference to FIG. 4, the URL may be configured through the use of a configuration engine. Upon accessing the designated location, the client is provided with a map control object. Because the initial request from the client preferably includes information identifying the type of device embodying the client (e.g., desktop computer, laptop computer, etc.) as well as the application being accessed (e.g., a trucking company versus an air freight company), the map control provided by the map services component 225 can be specifically tailored to the requesting device and application. Additionally, the map services component 225 provides the client with a location where various map images are stored, as well as configuration information for such images. As a user of the client 240 navigates through various views, the map control obtains additional map and asset information necessary to update the new views. To this end, the map control periodically polls the event dispatcher component 227 to obtain updated event information affecting assets that are displayed in the current view. Poll intervals are provided to the map control by the map services component 225, as described in greater detail below. In a preferred embodiment, the map control is also implemented as an ActiveX control.

Figure 10:
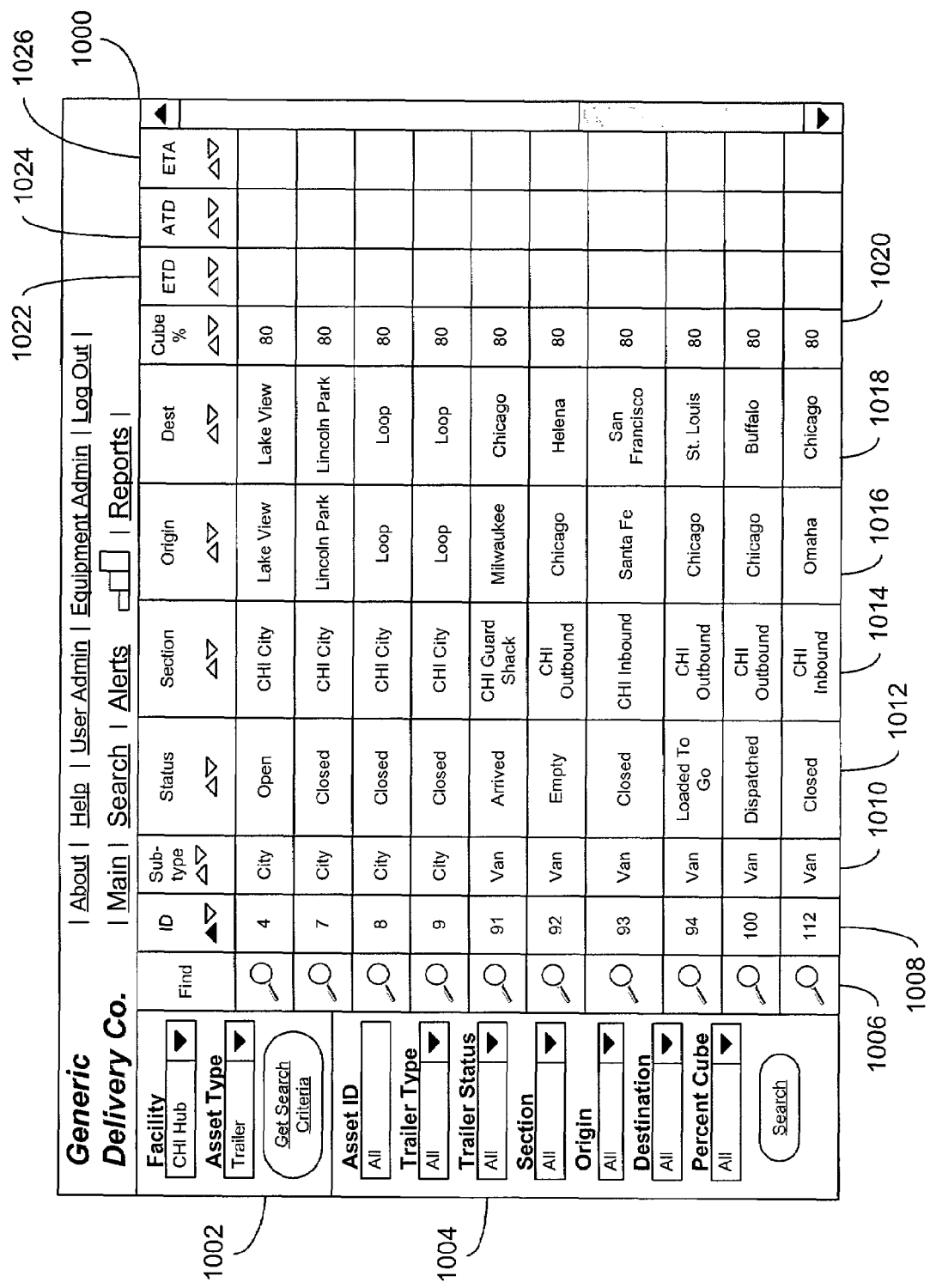

The application web pages 249 comprise HTML-based components as well as active server pages. The application web pages 249 support the user interface elements of the system. An exemplary embodiment of the user interface in accordance with the present invention is presented below with reference to FIGS. 5-10. For example, FIGS. 9 and 10 illustrate an alerts page and a search page, respectively, implemented as active server pages. Additional active server pages may be provided as a matter of design choice. Furthermore, various elements of the displays depicted in FIGS. 5-10, such as legends, navigation bars, etc. may be implemented using HTML techniques, as known in the art.

In addition to the clients 240, the tracking manager 210 is capable of communicating with a plurality of remote devices 262-264. In a preferred embodiment, communications with the remote devices is based, in part, upon the SOAP standard. Such devices typically operate within a wireless communication system 260 and may comprise mobile phones, pagers, personal digital assistants and the like. As described in greater detail below, the tracking manager 210 may provide information regarding alerts to the remote devices. This would be useful, for example, where a manager needs to be notified of a particular condition immediately.

The status tracking structure 104 preferably comprises a plurality of tags 270 and sensors 271 in communication with a plurality of readers 272. The plurality of readers 272 communicate with a data collection service 274 which, in turn, communicates with the event engine component 229. The types of tags used is a matter of design choice typically dependent upon the particular application in which they are used. The tags may comprise passive or active tags such as are available from a variety of vendors, such as Intermec. Likewise, the readers 272 may comprise any of a number of commercial available readers (e.g., like those available from Intermec) capable of communicating with the tags 270. The data collection system 274 is provided to gather the event data on a periodic basis from the readers 272. Often, the tags, readers and data collection system are provided by a single provider, although this is not a requirement. The sensors 271, if provided, may be independent of, or integral to, the tags 270. Preferably, the sensors are capable of measuring a variety of environmental variables such as temperature, humidity, pressure, vibration or any other environmental condition that may be detected by a sensor.

In yet another embodiment, the status tracking structure may comprise, instead of tags and readers, GPS receivers capable of providing location information when polled. It should be noted that the present invention is not limited by the particular implementation of the status tracking structure used. Rather, the present invention may operate upon event information provided by virtually any type of status tracking structure.

The tracking manager 210 is in communication with a database 280 that, in a preferred embodiment, comprises application tables 282, legacy tables 284 and execution architecture tables 286. The application tables 282 comprise that data necessary to implement the status tracking system in accordance with the present invention. Particular classes of information stored in the application tables 282 are set forth below in Table 1.

TABLE 1

| Application Tables | Description |
|---|---|
| USER | All authorized users of the application. |
| ALERTS | All alert-related data. |
| ALERT_TYPE | Short descriptions used in the Search page display. |
| ALERT_TYPE_OPTION | Possible actions in response to an alert type. |
| ALERT_OPTION | Actual option taken in response to an alert. |
| LEG | Specific leg in a route. |
| ROUTE | Beginning and end destinations. |
| TRANSPORT_ROUTE | Route taken by a particular asset. |
| TRANSPORT_TYPE | E.g., ground, air, ship. |
| TRANSPORT | Actual transport mechanism. |
| LOCATION_TYPE | E.g., region, facility, area, section. |
| LOCATION_REF | Name of a location. |
| LOCATION_SUBTYPE | Types within a location. |
| ASSET_SUBTYPE | Types of a particular assets, e.g., vans or "pups" for trailers |
| ASSET_REF | Description of an asset type. |
| CONTROLLER | Identification of the entity which owns or is responsible for the asset such as an individual, or a control center. For example, if there were multiple centers they would each have a unique ID. |
| ROUTE_LEG | Which route a particular leg is assigned to. |
| PRIORITY_REF | Levels of priorities for alerts. |
| LOCATION | Actual location identification. |

The legacy tables 284 comprise data specific to a particular client application. For example, in a trucking application, the legacy tables 284 comprise data traditionally maintained by the trucking company. A particular example of the types of data maintained in the legacy tables in a trucking application are set forth below in Table

TABLE 2

| Legacy Tables | Description |
|---|---|
| ASSET | Asset identification. |
| ASSET_TYPE | Particular type of asset. |
| TEAM | Which driver team asset is associated with. |
| DRIVER | Which driver asset is associated with. |
| TRANSPORT_SCHEDULE | Expected schedule for each asset. |
| REPORT | Whether asset has been dispatched. |
| DISPATCH | Location where asset is dispatched. |
| DOOR | Dock identification. |

TABLE 2-continued

| Legacy Tables | Description |
| --- | --- |
| SECTIONS | An area of one of the map views. |
| SORT | Schedule for sorting operations. |

The execution architecture tables 286 comprise data used to implement the underlying physical structure of the system. For example, the execution architecture tables 286 comprise an event table used to store the event information as it is received by the event engine component 229. Examples of additional data maintained by the execution architecture tables in accordance with a preferred embodiment are further illustrated in Table 3 below.

TABLE 3

| Architecture Tables | Description |
| --- | --- |
| EVENT | All event information. |
| CUSTOMIZATION | Configuration information provided by configuration engine. |
| SERVICE_INFO | Database maintenance information. |
| ASSET | Asset identification. |
| ASSET_TYPE | Particular type of asset. |
| TAG | Tag identification. |
| READER_RANGE | Location identifications. |
| CHAIN_RELATIONSHIP | Relationships between assets, e.g., "tractors couple to trailers" |

The tracking manager 210 operates in conjunction with one or more external components 290 to provide additional functionality. For example, the external components 290 may comprise an e-mail component such as AspMail used to send e-mail messages concerning alerts to necessary personnel. Additionally, the external components 290 may comprise enterprise application integration software, such as Microsoft's Biz Talk product as well as other operating system software necessary to implement the tracking manager 210. Those having ordinary skill in the art are familiar with the use of such external components.

Figure 3:
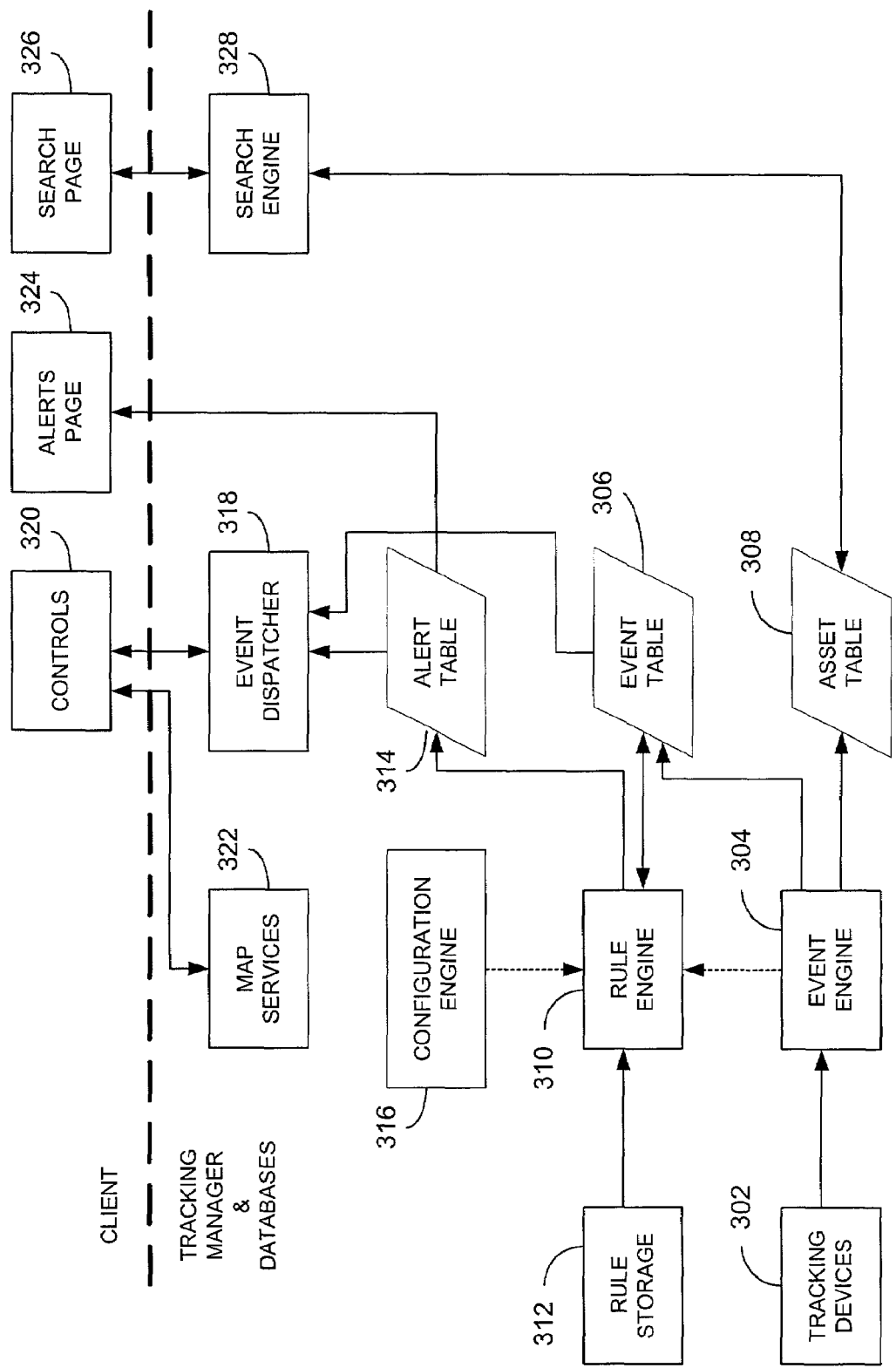
FIG. 3 is a block diagram illustrating functional relationships between various components in accordance with the present invention.
Figure 5:
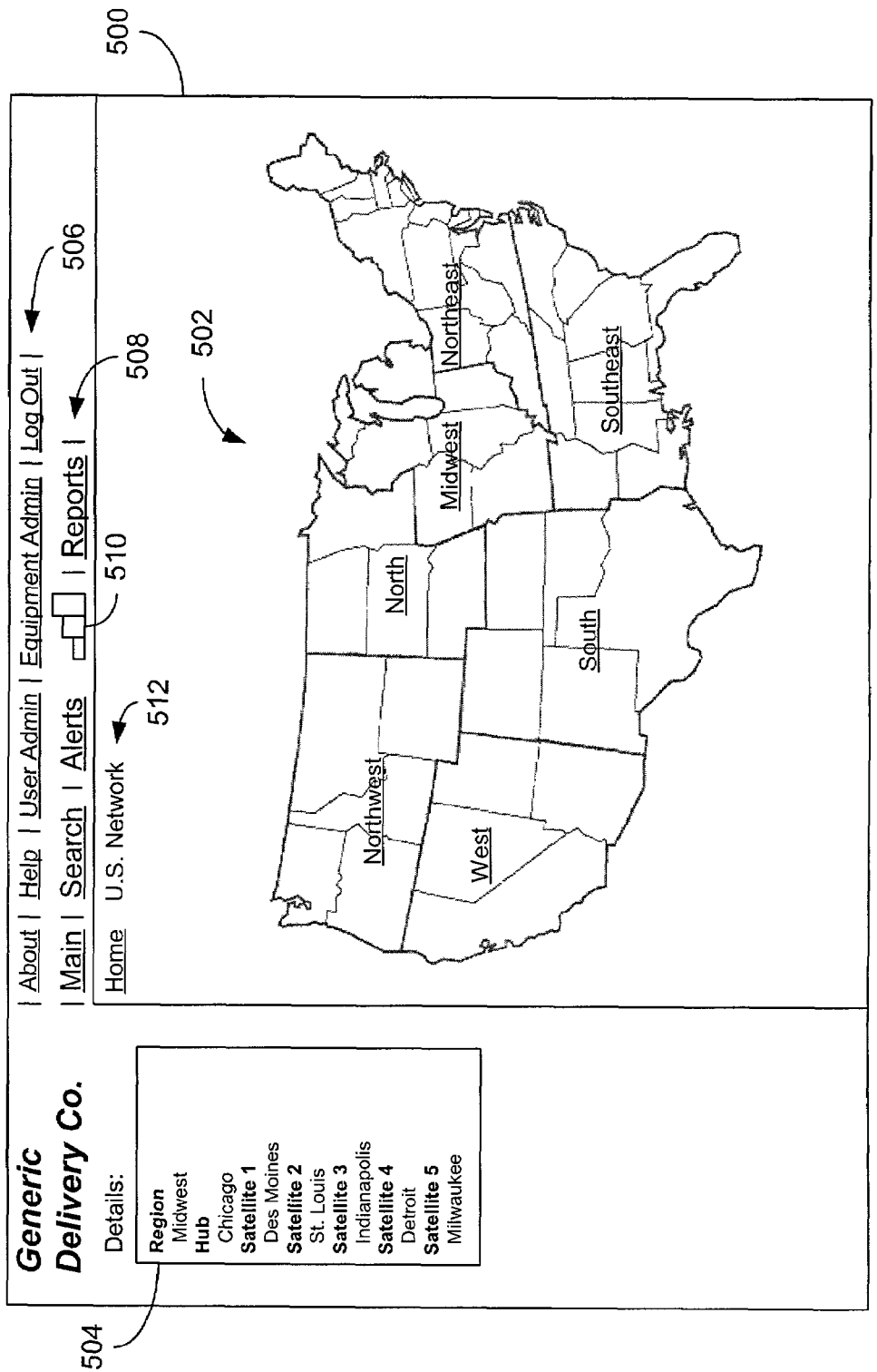

Referring now to FIG. 3, a functional block diagram of the present invention is illustrated. In particular, FIG. 3 illustrates various ones of the components and tables described in FIG. 2. In operation, a plurality of tracking devices 302 provide event information to an event engine 304. As previously described, the tracking devices 302 may comprise a plurality of tags and associated readers, GPS receivers, or any other devices capable of providing event information as defined herein. The event engine 304 provides the event information to an asset table 308 and an event table 306. In a preferred embodiment of the present invention, the event table 306 and asset table 308 form a part of the execution architecture tables 286 illustrated in FIG. 2. The event table 306, for each event detected by the tracking devices 302 and sent to the event engine 304, also preferably stores information regarding events such as the type of event, the date of the event, a particular asset implicated by the event, and in the case of location information, a location identification corresponding to the event. A location identification may comprise, for example, any indicia associated with a particular tag reader whose exact location is known. As described below, the event table also stores, for each event, a corresponding alert ID if that event gives rise to an alert when processed by the rule engine 310. The asset table 308, as its name would imply, stores data relative to each asset indexed according to an asset identification. As event information is received by the event engine 304, the asset table 308 is updated, particularly location information relative to separate assets.

In response to receiving event information, the event engine 304 calls upon the rule engine 310 to reassess one or more rules in light of the recently received event information, as illustrated by the dotted line. The rule engine 310, in communication with the rule storage 312, evaluates one or more immediate rules when called by the event engine 304. In the context of the present invention, the rule engine 310 evaluates or assesses a given rule by testing the truth of the conditions defined by the rule in light of the recently received event information. Examples of such immediate rules in the context of an air cargo shipping business include, but are not limited to, whether a given container is within a fifteen minute range of a departing plane, whether a given container is less than 50 percent full before being loaded on a departing plane, whether a given container is of the right type before being loaded on the plane, and whether two containers going to the same destination are less than 90 percent full combined. Techniques for assessing the truth of such rules in light of the event information provided to the rule engine will be readily apparent to those having ordinary skill in the art. For example, the evaluation of such rules is essentially equivalent to performing database queries for a given set of parameters. Furthermore, the rules evaluated by the rule engine component 310 need not necessarily be limited to temporal and spatial conditions. For example, the rules may also define conditions based on environmental parameters such as temperature, pressure, etc.

In addition to calls from the event engine 304, the rule engine 310 may also be called by the configuration engine 316, as illustrated by the dotted line. In particular, the configuration engine 316 periodically calls the rule engine 310 in accordance with one or more stored frequencies. This is illustrated in FIG. 4 where a data entry screen 400 used to provide configuration data to the configuration engine 316 is illustrated.

Figure 4:
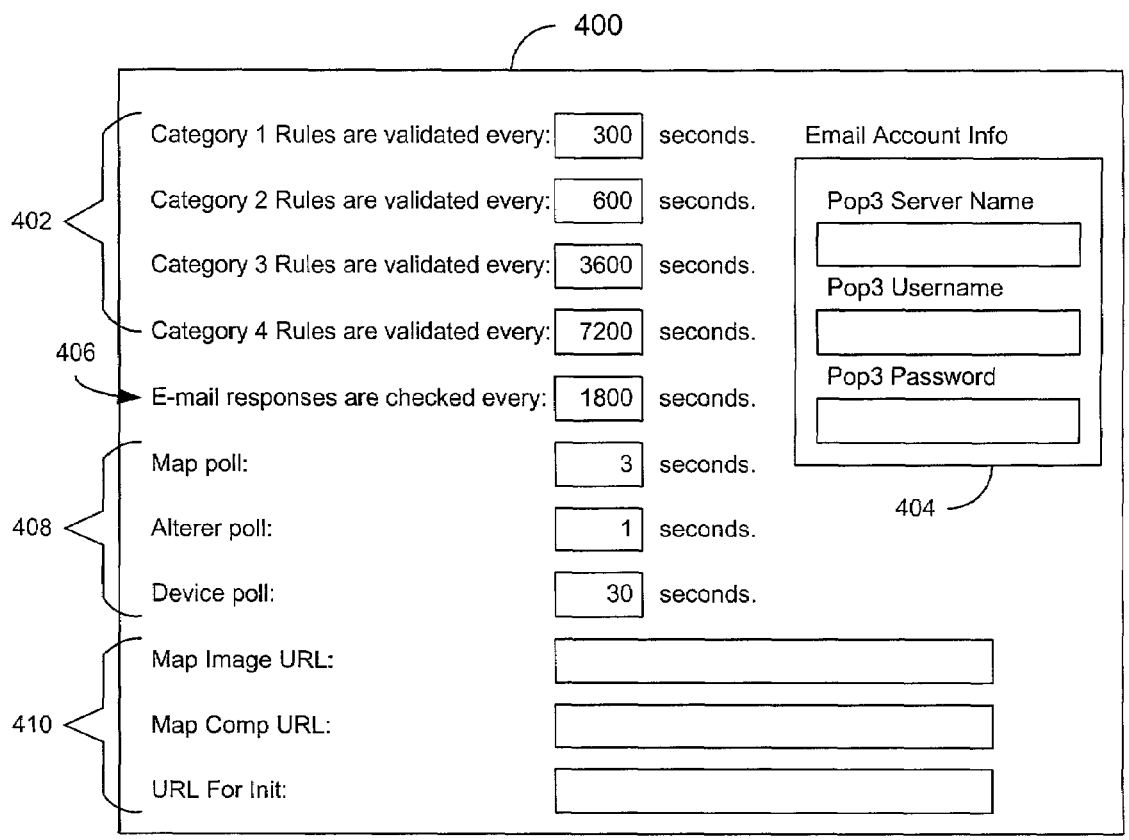
FIG. 4 illustrates an exemplary configuration data entry screen in accordance with the present invention.

In the example of FIG. 4, a plurality of frequencies may be entered by a user. Each of the frequencies entered corresponds to a given category of periodic rules. In a preferred embodiment, four categories of periodic rules are provided. Furthermore, in the example shown, these frequencies are defined in terms of recurring intervals expressed in seconds. However, those having ordinary skill in the art will recognize that such frequencies may be equivalently expressed in other manners. As previously noted, periodic rules are not as strongly tied to individual occurrences of event information. Rather, periodic rules tend to assess the overall status of a given area, although they may be temporally-based as well. For example, a typical periodic rule, in the context of a trucking business, might test whether twenty or more empty trailers are currently within a yard.

By making user-configurable frequencies with which different categories of periodic rules are validated, the present invention provides greater flexibility and control to system users.

FIG. 4 also illustrates other data initialization fields as shown. For example, as described in greater detail below, e-mail messages regarding alerts generated by the system may be sent to a particular e-mail account based in part upon the information entered into the e-mail account information fields 404. Likewise, a data field 406 is provided for entry of a polling interval with which e-mail responses are checked. Additionally, data entry fields 408 are provided for other polling intervals as shown. In particular, a map poll interval is provided which instructs each client's map control 247 how often the client should request updated event information from the event dispatcher. Likewise, an alerter poll interval is provided which allows a user to designate how often each client's alert control 247 requests alert information from the event dispatcher. In this manner, client polling intervals are controlled by the tracking manager rather than the clients themselves, thereby providing a system administrator greater control over the system. A device poll interval may be provided which instructs the event engine how often it should poll the readers (assuming a tag/reader environment) for event information. Finally, a plurality of map data entry fields 410 are provided which instruct the map services 322 where to go to obtain various map display data files. In particular, the map image URL data field points to where the map view images are kept. The map comp URL points to the location of an OCX map component, i.e., the map control 247 described above with reference to FIG. 2. Finally, the "URL for init" points to the location of the configuration file for the map.

Returning again to FIG. 3, regardless of the manner in which it is called, the rule engine 310 evaluates one or more rules stored in the rule storage 312 based on the event information stored in the event table 306. When the conditions set forth in a given rule are found to be true, the rule engine 310 generates an alert which is thereafter stored in the alert table 314. An alert level is inherent, or explicitly defined, in the definition of each rule. Thus, satisfaction of the conditions defining various rules give rise to correspondingly varying levels of alerts. Additionally, in a preferred embodiment, such alerts are also stored in the event table 306. In general, alerts are associated with particular assets and particular locations.

As previously described, the event dispatcher 318 serves to provide event information from the event table 306, as well as alerts from the alert table 314, to clients. This is achieved in at least two ways. First, clients, based on configuration data provided by the configuration engine 316, may periodically request event and alert information from the event dispatcher 318. In a preferred embodiment, the clients make such requests via controls 320, as previously described.

Figure 11:
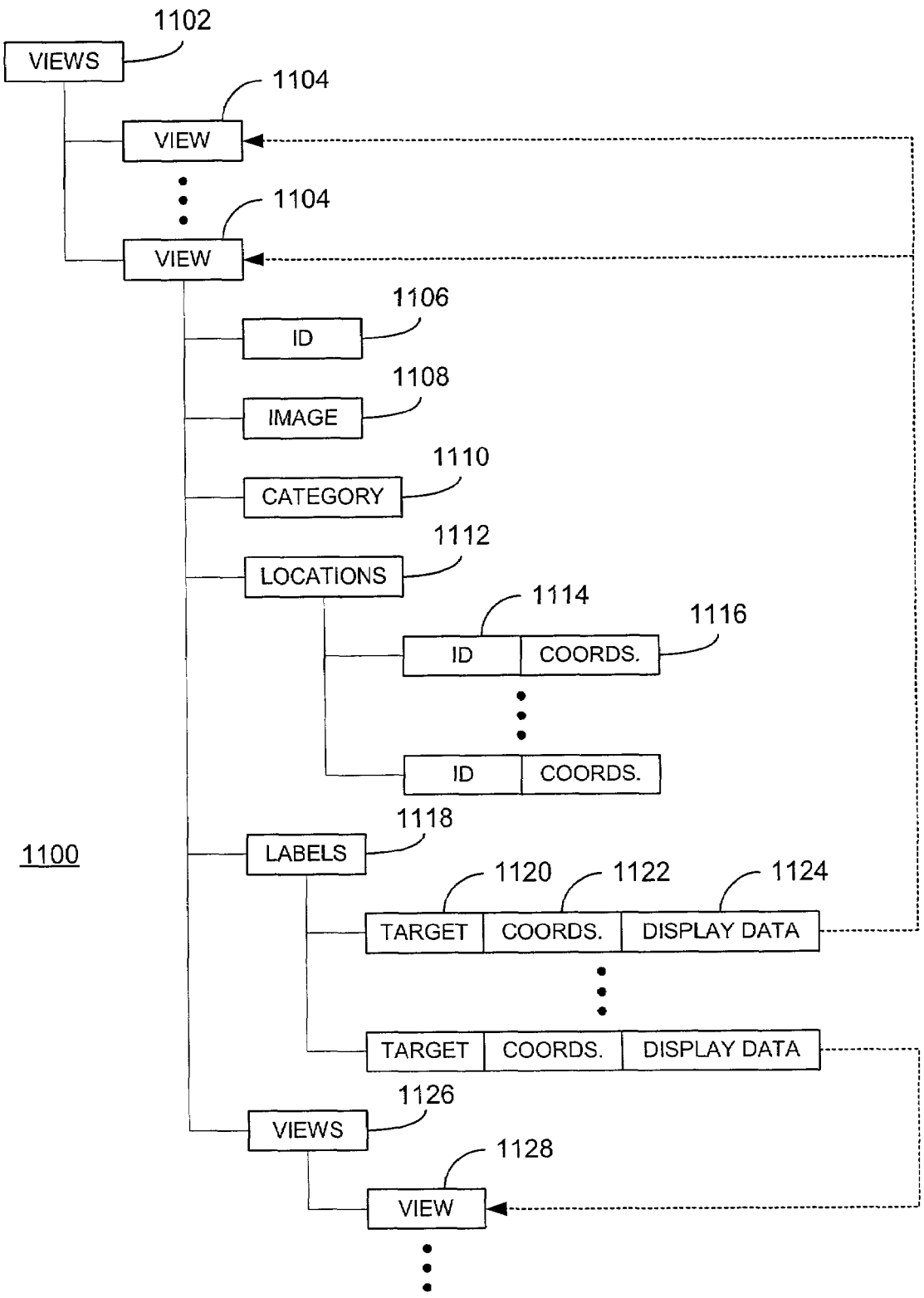
FIG. 11 illustrates a map data structure in accordance with the present invention.

In addition to communicating with the event dispatcher 318, the controls 320 also communicate with the map services 322 whenever the client in which the controls 320 reside first establishes communication with the tracking manager or changes views. In particular, a map control communicates with the map services 322 to get initial map data or new map data corresponding to a new view. In a preferred embodiment, the present invention uses a map data structure 1100 illustrated in FIG. 11. As shown in FIG. 11, the data structure 1100 is organized as a hierarchy of views 1102, 1126. That is, a given set of views 1102 comprises at least one view 1104 which may itself comprise further sets of views 1126. This nested structure facilitates navigation through a variety of map views as required by the present invention and described in further detail below. With any particular view 1104, a variety of data fields are provided. This is illustrated in FIG. 11 for a single view 1104b.

For any given view, an image identification 1106 is provided that identifies a particular image depicting a geographic area, i.e. a map. An image data field 1108 specifies an address or location where the actual image data file corresponding to the image identification 1106 is stored. A category field 1110 provides the appropriate "details view" (see, e.g., FIG. 8, bottom of element 808) to be called for the corresponding map. As shown, for example, in FIGS. 5-8, different maps preferably call for different details views based on the information depicted in the maps. Additionally, the view 1104 comprises a locations directory 1112 and a labels directory 1118.

The locations directory 1112, as its name would apply, comprises at least one location entry within the geographic area depicted by the image 1108. For example, with reference to FIG. 5, the geographic area depicted by the image is the continental United States with particular locations shown, i.e., Northeast, Southeast, Midwest, North, South, Northwest and West. Preferably, each location entry comprises a location identification 1114, e.g., "Midwest," and spatial coordinates 1116 defining the location corresponding to the location identification 1114. The spatial coordinates are preferably defined relative to the particular image with which they are associated. The labels directory 1118 preferably comprises at least one label entry as shown. In turn, each label entry preferably comprises display data 1124 and spatial coordinates 1122 which define where the display data is to be displayed relative to the image 1108. For example, the display data may comprise a text string, e.g., "Midwest," to be displayed. Additionally, each label entry further comprises a target entry 1120 indicative of another data structure (view) to be accessed in the event that the display data 1124, when displayed on the image 1108, is selected (e.g., clicked on using a mouse/cursor mechanism, as known in the art). Preferably, the target entry may point to any other view comprising a part of the data structure 1100. This is illustrated by the dotted lines in FIG. 11. For example, a target entry may point to a parent portion of the data structure 1100, such as the view labeled with reference numeral 1104a. Alternatively, a target entry may point to its own corresponding view, for example, the view labeled with reference numeral 1104b. Further still, a target entry may point to a child portion of the data structure 1100, for example, the view labeled with reference numeral 1128. In a preferred embodiment, successively higher views within the hierarchy of the data structure 1100 correspond to geographic areas that encompass those views farther down in the hierarchy of the data structure 1100. For example, at the highest level of the hierarchy, a given view may correspond to a nationwide geographic area, such as the continental United States. Further down the hierarchy, one or more regional-based geographic areas may be depicted, each with one or more facility-based geographic areas depicted within those views. Those having ordinary skill in the art will recognize that such a hierarchical structure lends itself to providing the ability to "drill down" within maps.

Referring once again to FIG. 3, the functionality of an alert page 324 and search page 326 on the client-side are illustrated. The alert page 324, as its name would imply, serves to display a list of alerts relative to a given view, and to allow viewers of the alert page to take actions based on those alerts. Further discussion of the alerts page 324 is provided relative to FIG. 9 below. The search page 326 provides the ability to enter search criteria, which search criteria is thereafter provided to a search engine 328. In the context of the present invention, the search criteria entered through the search page 326 depends in part upon the particular business to which the present invention is applied. In general, however, the search page 326 allows users to search for assets based on locations and asset types for any asset being tracked by the system. Further discussion of the search page 326 is provided below relative to FIG. 10.

Referring now to FIGS. 5-10, an exemplary embodiment of the present invention is illustrated. In particular, FIGS. 5-8 illustrate a hierarchy of maps through which a user of the system may view location and/or status information regarding the plurality of assets in varying level of details. The example shown in FIGS. 5-8 describes the operations of a generic delivery company having operations spread throughout the continental United States. In a top level display 500 illustrated in FIG. 5, an image 502 depicting the continental United States is shown. Additionally, a level indicator 512 illustrates where, within the hierarchy of map images, a user has currently navigated. For the purposes of illustration, the underlined text shown in FIGS. 5-8 is selectable as in the case, for example, of a hyperlink or similar mechanism. As shown, display data is included in the map image 502, describing a variety of regions within the United States. The display data may be selected in order to drill down to a map image corresponding to that particular region.

A details section 504 corresponding to the top level view 500 is also provided. At any given level, the details region 504 provides specific information corresponding to the particular map image being displayed and/or a particular feature of the currently displayed map that is selected. In the example shown in FIG. 5, it is assumed that the "Midwest" display data has been selected and that the details region 504 is therefore displaying information regarding the Midwest region. Selection of the Midwest region, for example, by single clicking (assuming a mouse/cursor mechanism) on that region, changes the data being displayed to that shown in FIG. 6, as described in detail below.

In addition to the map display, each display level comprises a series of administrative menus 506 that may be selected by a user as needed. In addition to "About", "Help", and "Logout" menus, which menus implement functionalities typically associated with these menu types, there is also provided a "User Admin" and a "Equipment Admin" menu. The User Admin menu is provided to allow a system administrator or other manager to enter or modify data regarding authorized users of the system. Similarly, the Equipment Admin menu allows information regarding particular assets to be added or modified. For example, in addition to an asset identification type and/or subtype, information regarding a particular tag (assuming a reader/tag system) associated with that piece of equipment may also be entered.

A set of navigational menus 508 is also provided which menus implement, in addition to a reporting function, the search and alert capabilities described above. Particular displays relating to the alert and search capabilities are shown below with respect to FIGS. 9 and 10.

An alert icon or graphic 510 is provided which serves as an indicator of the presence of alerts of one or more priority levels. In the example shown in FIG. 5, three different priority levels (high, medium and low) are assumed, and a bar chart format is used to indicate the relative number of alerts currently pending at each priority level for the currently selected facility. The alert data reflected in the alert graphic 510 is provided by the alert control, as previously described relative to FIG. 2.

Figure 6:
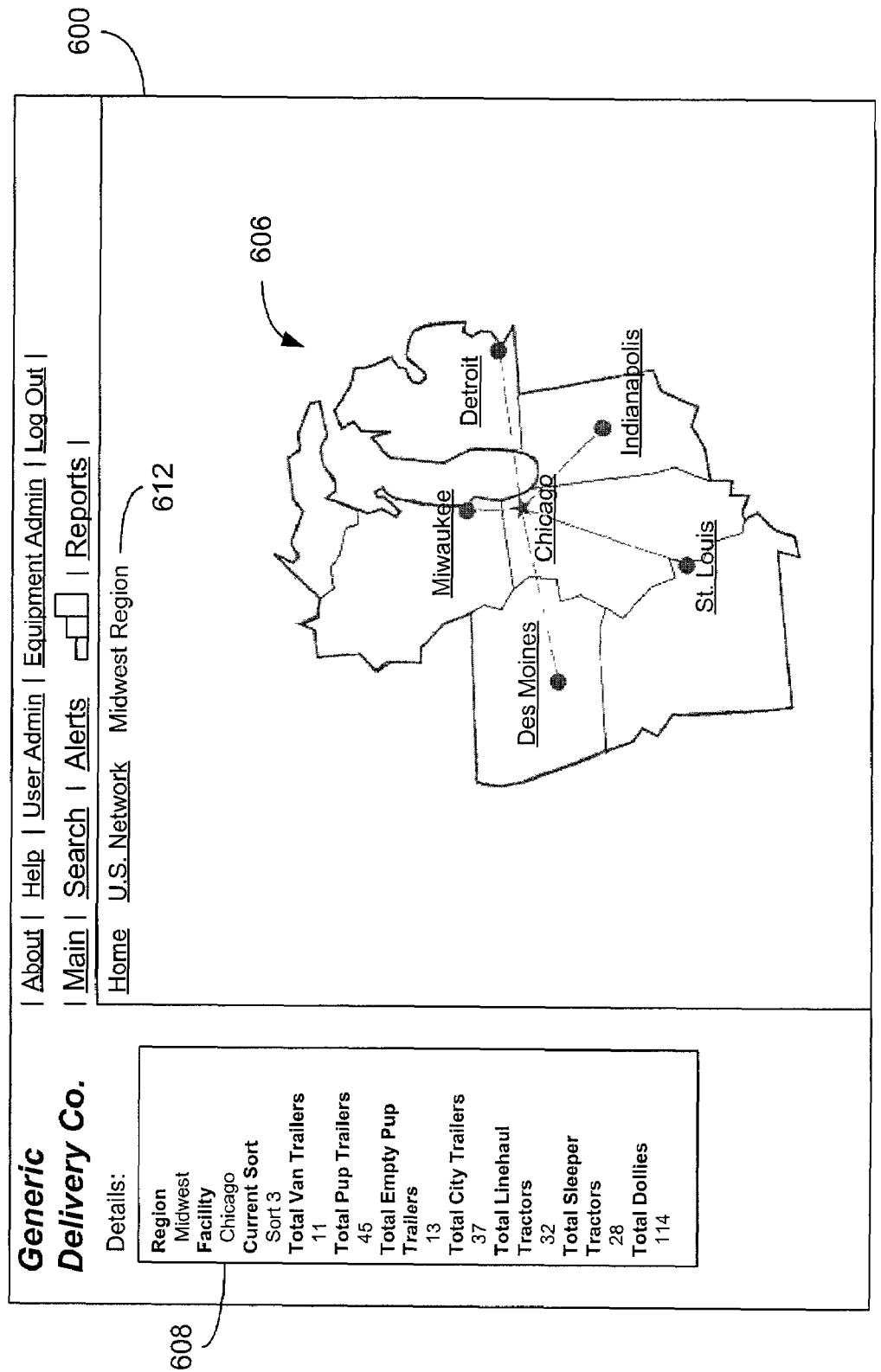

Referring now to FIG. 6, a display 600 corresponding to a particular region (in this instance, the Midwest region depicted in FIG. 5) is shown. The level indicator 612, in this case, has been updated to reflect the fact that a more particularized region has been selected and is now being displayed. Note also that any of the proceeding levels within the level indicator 612 may be selected by a user such that the display is switched to that corresponding level. Furthermore, the map image 606 now illustrates the particular region in greater detail. In this example, display data presented along with the map image 606 corresponds to particular hubs within the Midwest region. Assuming that the Chicago hub has been selected (for example, by single clicking using a mouse/cursor mechanism), the detail section 608 displays information relevant to the Chicago hub only. As shown, this information may comprise information regarding the number of each type of asset currently located within the Chicago facility. Those having ordinary skill in the art will recognize that other types of information could be displayed in the details section 604 as a matter of design choice.

Figure 7:
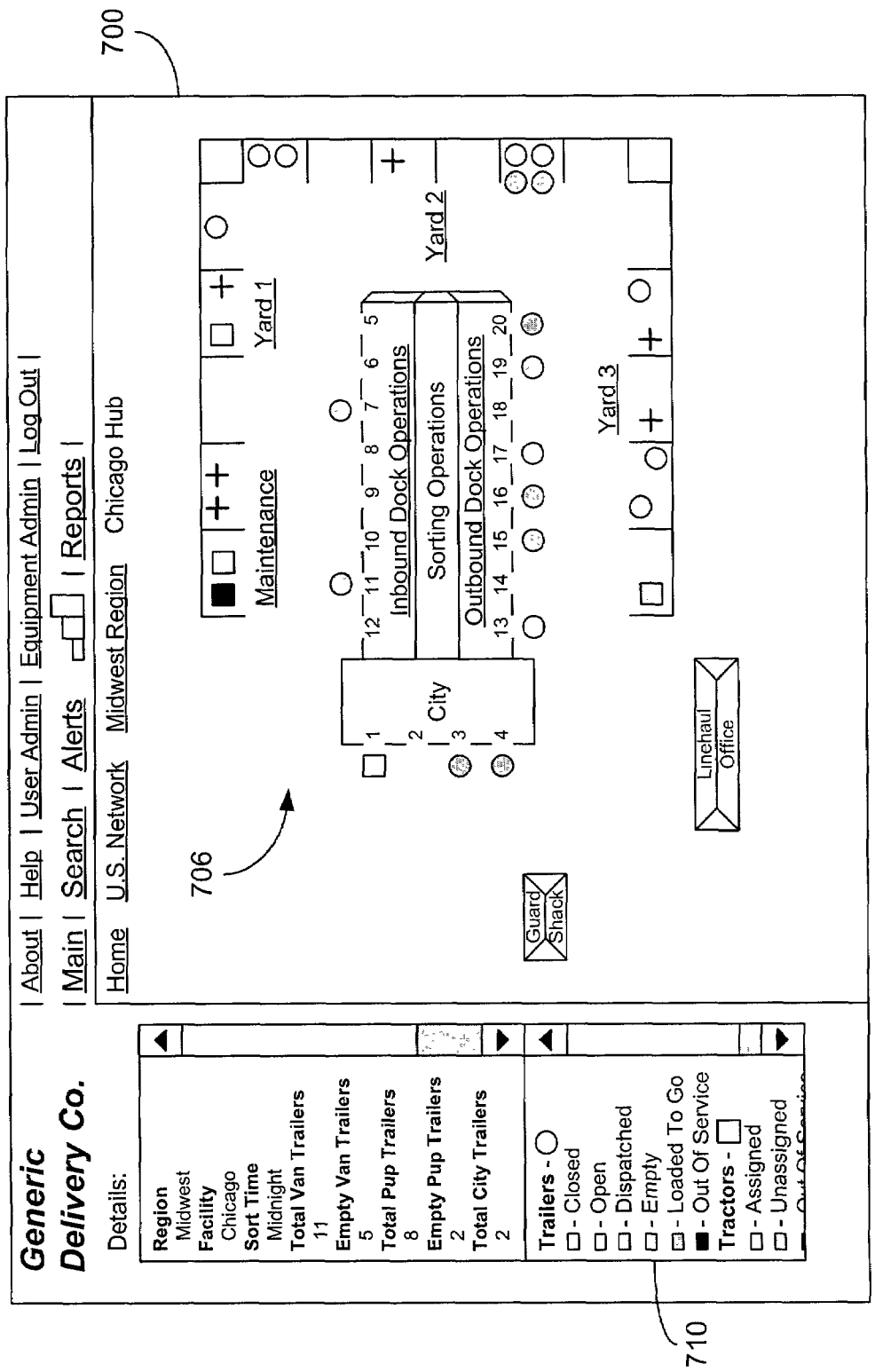

Selection of the Chicago facility (for example, by double clicking using a mouse/cursor mechanism), in this example, changes the display to the display 700 illustrated in FIG. 7. The map image 706 illustrates the Chicago facility in sufficient detail so as to identify the location of particular assets within the facility. As additional event information is provided to the client currently displaying the map 706, icons representing particular assets may be redisplayed as they move. Note also, in addition to the location of particular assets, information regarding the particular status of assets, as illustrated in the detail section 710, is also shown. Such status information may be provided by obtaining the status information for a particular asset from one of the legacy tables 284.

Figure 8:
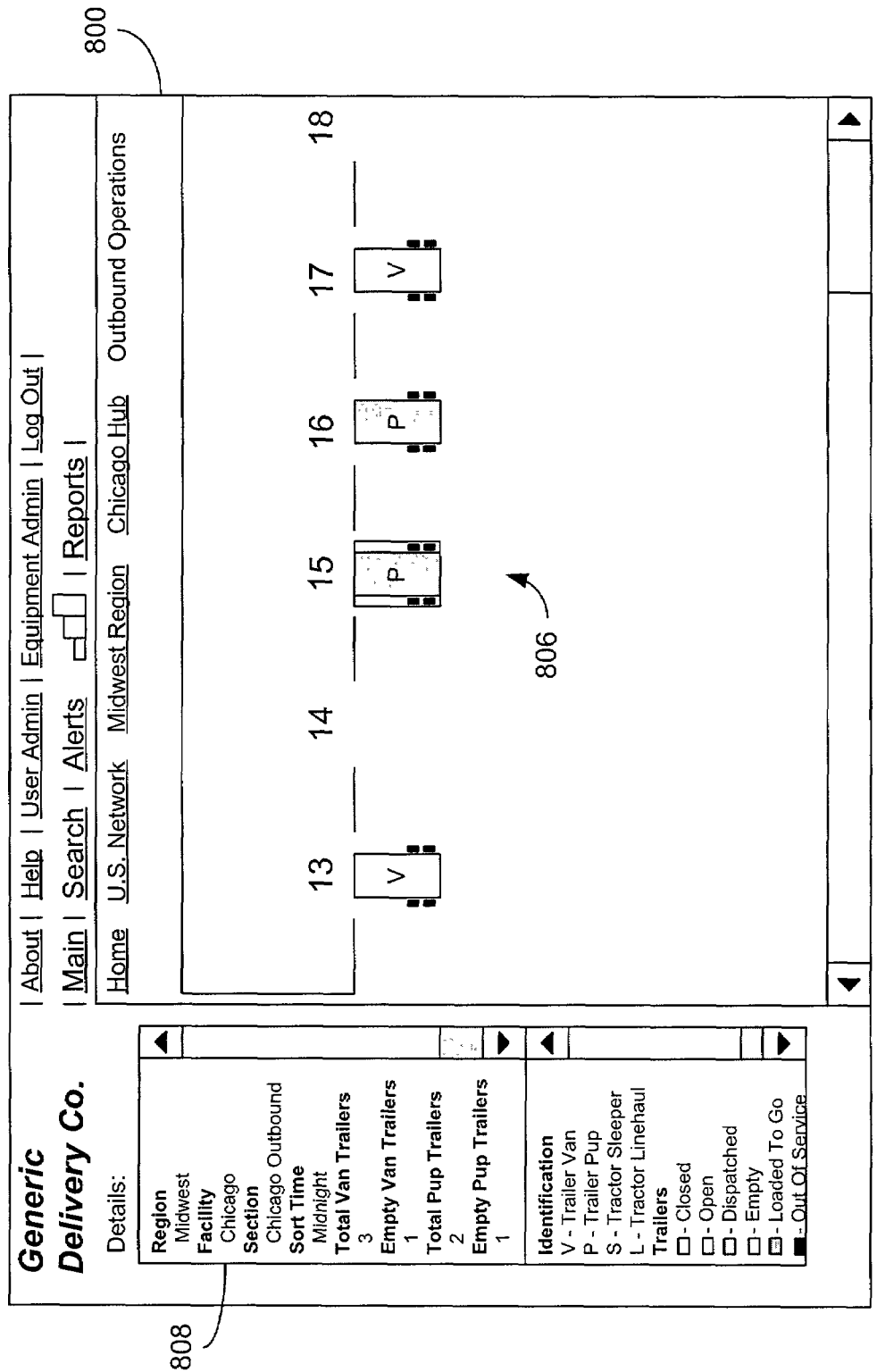

A further level of detail may be provided by selecting a particular area within the facility. The example shown in FIG. 8 illustrates a display 800 when the "Outbound Dock Operations" label of FIG. 7 has been selected. In this display, an image 806 provides icons identifying particular types of asset being displayed in addition to their particular location. In the example shown, different types of trailers (as used in the trucking industry) each having a different status, are shown. Once again, the detail section 808 illustrates information relevant to this particular view.

Referring now to FIG. 9, a display 900 corresponding to an alert page is shown. Criteria entry fields 902 are provided whereby a particular facility and various levels of priorities may be specified. By selecting the "Get New Alerts" button, alerts corresponding to the particular criteria entered are retrieved via the event dispatcher within the tracking manager. For each alert retrieved in this manner, a variety of fields are provided.

First, a find button 903 is provided with each alert (each alert being depicted as a separate row in FIG. 9) such that selection of the find button 903 will cause a search for the asset corresponding to the alert, thereby providing a corresponding map showing the asset and, as a result, identifying the location of the asset. Each alert entry has associated with it a unique alert identification 904 which may be sorted numerically in ascending or descending order.

When a given alert is selected, a long form message descriptive of the alert is provided in a message field 924. In the example shown, a message corresponding to the alert having alert identification number 6350 is being displayed in the message field 924.

A short description 906 is provided for each alert which provides a quick understanding of the nature of the particular alert. Note that the short descriptions are representative of the particular rules that gave rise to the alerts. A priority 908 indicates a relative priority of the particular alert. In a preferred embodiment, three priority levels are provided as shown, although any number of levels may be used as a matter of design choice. Where applicable, an equipment identification 910 associated with the particular alert is also provided. Finally, location information 912 as well as date-time information 914 are provided with each alert. In this manner, a user of the alerts page may quickly ascertain the nature of any alert in order to determine a proper response.

In order to respond to any given alert, a variety of options 916-922 are provided. A message option 916 allows a user to send a message to the location associated with a particular alert. In this context, such a location comprises a computer or other device capable of receiving the message located at a specific spot within the location, e.g., a trailer yard. Alternatively, an e-mail option 918 is provided whereby an e-mail message may be directed to a particular person. Further still, a recheck option 920 and a take no action option 922 are also provided as ways to respond to a given alert. Regardless of the particular response selected, the alerts are removed from the screen if one of the response options is selected.

Referring now to FIG. 10 a display 1000 corresponding to a search page is illustrated. A search criteria section 1002 is provided where a user can enter data corresponding to a particular facility and a particular asset type and, in response to selecting the "Get Search Criteria" button, be provided with a listing of search criteria 1004 as shown. Various types of search criteria may be provided depending on the particular asset type selected. The particular search criteria 1004 illustrated in FIG. 10 correspond to the exemplary trucking application and further illustrate the use of pull down menus to select the search criteria. In the example shown in FIG. 10, each search criterion is set to "all", in which case the search will retrieve all possible data without filtering data out. Of course, instead of "all", for instance, under "Trailer Status", one could also choose "closed", "arrived", "open" or another listed choice. For example, if "closed" were selected under "Trailer Status", then only those trailers with a "Trailer Status" of closed would be listed. While the above-example serves to illustrate the operation of searches in accordance with the present invention, it should be understood that the particular search parameters provided are a function of the corresponding search criteria.

The example illustrated in FIG. 10 assumes a search has been performed and that a plurality of search results are now being displayed. In particular, each row illustrated corresponds to a particular search result. As in the case of alerts, each search result is represented through a variety of data fields. Furthermore, as in the case of the alerts, a find button 1006 is provided such that a map view is displayed that shows the location of the asset. corresponding to a given search result may be displayed. Additionally, the plurality of data fields 1008-1020 are provided which provide the relevant information regarding the particular asset.

An asset identification field 1008 is provided which sets forth a unique indicia associated with the given asset. A sub type field 1010 identifies a particular sub type associated with that asset, and will typically vary depending on the particular application of the present invention. A status field 1012 sets forth the particular status of the assets as of the time the search was performed. Once again, note that the status information is available through legacy databases previously described. The section data field 1014 describes the specific location of the asset, e.g., within a yard as shown in FIG. 8. An origin data field 1016 and a destination data field 1018 are also provided. In the particular example illustrated in FIG. 10, in which a trucking example is assumed, a so-called cube percentage 1020 is also provided. As known in the art, the cube percentage represents how full a given container is while in transit. Finally, data fields 1022-1026 corresponding to an estimated time of departure, an actual time of departure, and an estimated time of arrival, respectively, are also provided.

The present invention overcomes the limitations of prior art asset tracking systems by not only providing a system for tracking assets, but that also incorporates business intelligence. A tracking manager is provided that obtains event information from a status tracking structure and provides the event information, along with alert information generated based on rules, to clients in communication with the tracking manager. Based on the event and alert information, the clients provide a display comprising map images depicting at least the location of various assets thereon. Additionally, displays providing alert information are provided. In the manner, the present invention allows owners of assets to not only track the status of their assets, but to also glean operational insights previously unavailable to them.

The foregoing description of a preferred embodiment of the invention has been presented for purposes of illustration and description, it is not intended to be exhaustive or to limit invention to the precise form disclosed. The description was selected to best explain the principles of the invention and practical application of these principles to enable others skilled in the art to best utilize the invention and various embodiments, and various modifications as are suited to the particular use contemplated. It is intended that the scope of the invention not be limited by the specification, but be defined by the claims set forth below.

We claim:

1. An apparatus for tracking a plurality of containers, wherein the apparatus is coupled to a status tracking structure that provides event information regarding at least a portion of the plurality of containers, the apparatus comprising:
   a centralized tracking manager comprising a processor;
   an event table for storing the event information;
   a rule execution component, constituting at least a portion of the centralized tracking manager and coupled to the event table, that processes the event information in accordance with at least one rule, wherein the at least one rule tests for non-optimal use of at least one container of the plurality of containers based on the event information;
   a configuration engine component, also constituting at least a portion of the centralized tracking manager and coupled to the rule execution component, that causes the rule execution component, without regard to occurrence of the event information and according to at least one user-specified execution frequency, to process the event information in accordance with at least a portion of the at least one rule wherein the at least one rule comprises at least two rules, and wherein the configuration engine component associates at least two execution frequencies with the at least two rules such that a portion of the at least two rules is executed with a frequency different from other rules of the at least two rules; and
   an event engine component, also constituting at least a portion of the centralized tracking manager and coupled to the status tracking structure and the event table, that receives the event information, stores the event information in the event table and, in response to the receipt of the event information, causes the rule execution component to process the event information in accordance with at least a portion of the at least one rule.

2. The apparatus of claim 1, wherein the event information comprises location information corresponding to the plurality of containers.

3. The apparatus of claim 1, wherein the event information comprises environmental information corresponding to the plurality of containers.

4. The apparatus of claim 1, wherein the at least one rule determines whether at least one empty container of the plurality of containers has been allowed to sit for greater than a period of time.

5. The apparatus of claim 1, wherein the at least one rule determines whether at least two partially-full containers of the plurality of containers have been dispatched to a destination within a period of time.

6. The apparatus of claim 1, wherein the at least one rule determines whether a given container of the plurality of containers is less than half full prior to loading of the container on a vehicle.

7. The apparatus of claim 1, wherein the at least one rule determines whether two containers of the plurality of containers are less than ninety percent full when combined.

8. An apparatus for tracking a plurality of containers, wherein the computer architecture is coupled to a status tracking structure that provides event information regarding at least a portion of the plurality of containers, the apparatus comprising:

a centralized tracking manager comprising a processor;

an event table for storing the event information;

a rule storage component;

a rule execution component, constituting at least a portion of the centralized tracking manager and coupled to the event table and the rule storage component, that processes the event information in accordance with at least one rule stored in the rule storage component, wherein the at least one rule tests for non-optimal use of at least one container of the plurality of containers based on the event information and wherein the rule storage component permits modification of any of the at least one rule independent of the rule execution component;

a configuration engine component, also constituting at least a portion of the centralized tracking manager and coupled to the rule execution component, that causes the rule execution component to process the event information in accordance with at least one periodic rule of the at least one rule without regard to occurrence of the event information and according to at least one user-specified execution frequency wherein the at least one periodic rule comprises at least two periodic rules, and wherein the configuration engine component associates at least two execution frequencies with the at least two periodic rules such that a portion of the at least two periodic rules is executed with a frequency different from other rules of the at least two periodic rules; and an event engine component, also constituting at least a portion of the centralized tracking manager and coupled to the status tracking structure and the event table, that receives the event information, stores the event information in the event table and, in response, causes the rule execution component to process the event information in accordance with at least one of the at least one rule.

9. The apparatus of claim 8, wherein the event information comprises location information corresponding to the plurality of containers.

10. The apparatus of claim 8, wherein the event information comprises environmental information corresponding to the plurality of containers.

11. The apparatus of claim 8, wherein the at least one rule determines whether at least one empty container of the plurality of containers has been allowed to sit for greater than a period of time.

12. The apparatus of claim 8, wherein the at least one rule determines whether at least two partially-full containers of the plurality of containers have been dispatched to a destination within a period of time.

13. The apparatus of claim 8, wherein the at least one rule determines whether a given container of the plurality of containers is less than half full prior to loading of the given container on a vehicle.

14. The apparatus of claim 8, wherein the at least one rule determines whether two containers of the plurality of containers are less than ninety percent full when combined.

15. A method for tracking a plurality of containers in a system comprising a tracking manager coupled to a status tracking structure that provides event information, regarding at least a portion of the plurality of containers, the tracking manager comprising a processor and the method comprising:

receiving, by the tracking manager, the event information; and storing the event information in an event table; and processing, by the tracking manager, the event information in the event table in accordance with at least one rule that is evaluated regardless of occurrence of the event information and according to at least one user-specified execution frequency, wherein the at least one rule tests for non-optimal use of at least one container of the plurality of containers based on the event information, wherein processing of the event information further comprises processing the event information in accordance with at least a portion of the at least one rule in response to receipt of the event information and wherein the at least one rule comprises at least two periodic rules and the at least one user-specified execution frequency comprises at least two periodic frequencies associated with the at least two periodic rules such that a portion of the at least two periodic rules is executed with a frequency different from other rules of the at least two periodic rules.

16. The method of claim 15, wherein the event information comprises location information corresponding to the plurality of containers.

17. The method of claim 15, wherein the event information comprises environmental information corresponding to the plurality of containers.

18. The method of claim 15, wherein the at least one rule determines whether at least one empty container of the plurality of containers has been allowed to sit for greater than a period of time.

19. The method of claim 15, wherein the at least one rule determines whether at least two partially-full containers of the plurality of containers have been dispatched to a destination within a period of time.

20. The method of claim 15, wherein the at least one rule determines whether a given container of the plurality of containers is less than half full prior to loading of the given container on a vehicle.

21. The method of claim 15, wherein the at least one rule determines whether two containers of the plurality of containers are less than ninety percent full when combined.

22. A computer-readable medium having computer-executable instructions stored thereon for performing the method of claim 15.

* * * * *

UNITED STATES PATENT AND TRADEMARK OFFICE
CERTIFICATE OF CORRECTION

PATENT NO. : 7,627,666 B1
APPLICATION NO. : 10/056887
DATED : December 1, 2009
INVENTOR(S) : DeGiulio et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1553 days.

Signed and Sealed this

Twenty-first Day of December, 2010

David J. Kappos
*Director of the United States Patent and Trademark Office*